United States Patent [19]

Ried, Jr. et al.

[11] 4,044,263

[45] Aug. 23, 1977

[54] IONIZATION DUAL-ZONE STATIC DETECTOR HAVING SINGLE RADIOACTIVE SOURCE

[75] Inventors: Louis Ried, Jr., Boulder; Arthur L. Wade, Brighton, both of Colo.

[73] Assignee: Walter Kidde & Company, Inc., Clifton, N.J.

[21] Appl. No.: 544,818

[22] Filed: Jan. 28, 1975

[51] Int. Cl.$^2$ .................................................. G01T 1/18

[52] U.S. Cl. ...................................... 250/381; 250/385

[58] Field of Search ............... 250/381, 382, 384, 385, 250/389; 340/237 S

[56] References Cited

U.S. PATENT DOCUMENTS

| | | | |
|---|---|---|---|
| 2,968,730 | 1/1961 | Morris et al. | 250/382 |
| 3,560,737 | 2/1971 | Skildum | 250/384 |
| 3,681,603 | 8/1972 | Scheidweiler et al. | 340/237 S |
| 3,731,093 | 5/1973 | Scheidweiler et al. | 250/389 |

*Primary Examiner*—Alfred E. Smith
*Assistant Examiner*—David K. Moore
*Attorney, Agent, or Firm*—John E. Toupal

[57] ABSTRACT

This ionization detector or combustion product detector includes a single radioactive source located in an ionization chamber, and the ionization chamber includes portions comprising a reference zone and a signal zone. Electrical circuitry connected to the reference and signal zones provides an output signal directly related to changes in voltages across the signal zone in relation to the amount of particulates of combustion present in the ionization chamber.

40 Claims, 7 Drawing Figures

IONIZATION DUAL-ZONE STATIC DETECTOR HAVING SINGLE RADIOACTIVE SOURCE

BACKGROUND AND SUMMARY OF THE INVENTION

This invention relates to combustion product detectors of the ionization chamber type, and more particularly to such detectors employing a single radioactive source.

Prior art combustion product detectors have been of two types; a static type having two separate ionization chambers with each chamber utilizing its own radioactive source, and a dynamic type having a single ionization chamber having a single radioactive source. In the two-chamber static device, one of the chambers, a reference chamber, must be sealed or air tight, and the other chamber, a sampling chamber, is open to ambient conditions and allows the introduction of products of combustion into its interior. The reference and sampling chambers are connected in an electrical alarm circuit, and the electrical circuitry signals an alarm condition when products of combustion exceeding a predetermined level enter the signal chamber and alter the voltage across the chamber signifying a dangerous smoke or fire condition. In this manner, the reference chamber provides an electrical reference by which the sampling chamber's voltage is compared to signal the alarm condition. The single-chamber dynamic device is connected to elaborate electrical circuitry for constantly modulating the electrical operating characteristics of the chamber and monitoring the changes in modulation as products of combustion enter the chamber. Upon a predetermined change, the alarm is provided to signal a dangerous condition. Single-chamber dynamic detectors secure reliable performance but unfortunately are very expensive as a result of the electrical circuitry necessary for its dynamic operation.

Conventional two-chamber static combustion product detectors provide highly reliable operation under most conditions. The electrical characteristics of the reference chamber can be precisely established or determined during manufacture thereby securing a high degree of alarm sensitivity when the sampling chamber receives combustion product. Certain disadvantages are apparent when the conventional two-chamber detectors are manufactured in large quantities. Two radioactive sources, one in the reference chamber and one in the sampling chamber, are required at an increased cost. The reference chamber must be precisely manufactured so that it is completely sealed or air tight to prevent the introduction of combustion product within that chamber, which usually involves much attention and cost. The reference chamber must be constructed of very high quality insulation to eliminate current leaks and material which may contaminate the radioactive source, either of which would cause an undesirable or unstable operating condition. Furthermore, either the energy of radioactive source or the reference chamber must be adjusted to provide optimum conditions to insure precise operation of the detector. However, once a conventional two-chamber static device is currently manufactured, it provides highly desirable precision alarm-signalling performance.

The problems associated with a two-chamber static detector may be avoided if a combustion product detector of the static-operation type having a single radioactive source within a single ionization chamber is employed. Such devices are known in the prior art but these combustion product detectors are not of the dual ionization type recognized in the prior art as reliable and precise in operation. One such single radioactive source ionization detector has a single ionization chamber in which a grid is located at a position which affords the greatest voltage change when combustion product is introduced into the chamber. This device operates on a space-charge-limiting-effect principle, and does not employ dual ionization characteristics. Such space-charge-limiting-effect devices have no provision for providing reference and sampling chambers or zones and therefore lacks the recognized desirability of prior art two-chamber static devices. Accordingly, it is an object of this invention to provide an improved ionization dual-zone static detector having a single radioactive source which provides reliable and precise performance.

It is another object of this invention to provide an improved ionization dual-zone static detector having only a single radioactive source.

It is another object of this invention to provide an improved ionization dual-zone static detector having a single radioactive source in which a single ionization chamber provides the characteristics of a reference zone and a sampling zone.

It is a further object of this invention to provide an improved ionization dual-zone static detector which does not require selection of a radioactive source or adjustment of the ionization chamber or internal components.

It is a further object of this invention to provide an improved ionization dual-zone static detector having a single radioactive source that does not require an air tight or sealed ionization chamber.

It is yet another object to provide an improved ionization dual-zone static detector having a single radioactive source which is significantly less expensive to manufacture than conventional two-chamber static detectors.

It is yet another object of this invention to provide an improved ionization dual-zone static detector having a single radioactive source which greatly reduces possible negative effects which may effect prior art detectors.

To achieve these and other objects the present invention employs a single radioactive source in an ionization chamber to provide dual-zone ionization. The ionization chamber includes a relatively small portion and a relatively large portion comprising reference and signal zones respectively. Means for applying voltage across and conducting current through the reference and signal zones are also provided within the ionization chamber. The single radioactive source provides an ion current which flows in both zones. The voltage applying and current conducting means is arranged within the ionization chamber to conduct maximum changes of voltage across the signal zone products of combustion modify the electrical characteristic of the signal zone. Provision is also made for connecting the reference and signal zones in series, for applying voltage across reference and signal zones in series, and for monitoring the voltage across the signal zone to provide an alarm indication whenever the density of products of combustion within the ionization chamber exceed a predetermined maximum.

The features of novelty which characterize this invention are recited with particularity in the annexed claims. The invention itself, however, both as to its organization and method of operation together with further objects and advantages will best be understood by reference to the following brief description of the drawings and detailed description of the invention.

DETAILED DESCRIPTION OF THE INVENTION

Figure 1:
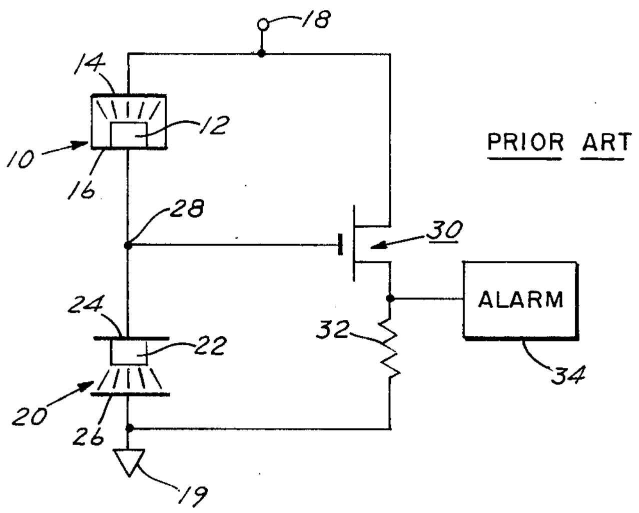
FIG. 1 is a schematic diagram of a combustion product detector employing separate reference and sampling chambers according to the prior art.

Referring now to FIG. 1, a conventional prior art two-chamber static combustion product detector is shown. It includes a sealed and air tight reference chamber 10 having its own radioactive source 12. Electrodes 14 and 16 are located on the interior of the reference chamber 10 and each electrode has an electrical connection at the external portion of the chamber 10. A signal chamber 20 is also included and is open to the ambient atmosphere and thus subject to conditions including products of combustion that might be carried by air. The signal chamber 20 has its own radioactive source 22 and electrodes 24 and 26, each of which is electrically connected to the external portion of the chamber 20. The sources 12 and 22 are typically alpha particle emitters such as americium 241 or radium 226, as is known in the art. The reference chamber 10 and the signal chamber 20 are electrically connected in series. A positive voltage terminal 18 provides a means for applying the voltage across the reference chamber 10 and the signal chamber 20 connected in series. A junction 28 provides a means for monitoring the voltage across the signal chamber 20 to which is connected the gate electrode of a field effect transistor (FET) 30. Resistor 32 is connected in the drain-source electrode path of the FET 30 between the source electrode and the negative reference 19. The voltage appearing across resistor 32 directly follows the voltage across the signal chamber 20 since FET 30 is connected as a source follower. The output signal across resistor 32 is typically applied to alarm circuitry shown in FIG. 1 in a block diagram form. When the voltage across the resistor 32 exceeds a predetermined limit, an alarm is produced.

Figure 2:
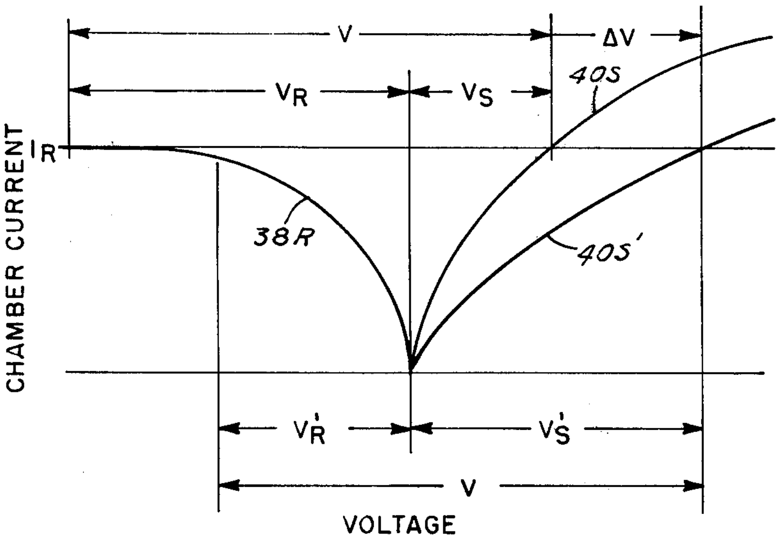
FIG. 2 is a graph of the electrical characteristics which explain the operation of the prior art device of FIG. 1 and of the present invention.

The operation of the prior art combustion product detector illustrated in FIG. 1 will now be described in conjunction with FIG. 2. Upon the application of the voltage at terminal 18, a portion of this voltage is applied across electrodes 14 and 16 of the reference chamber 10 resulting in an ion current flowing through chamber 10. The reference chamber current is adjusted to operate in a saturated region thereby providing a constant reference current resistant to changes of applied potential across this reference chamber. The constant reference current can be achieved by a predetermined degree of source 12 radioactivity to create a highly ionized condition within the reference chamber 10. This ionized environment remains uneffected by ambient conditions because of the sealed condition of the reference chamber. The operating characteristic of the reference chamber are thus relatively constant due to the sealed interior environment and the saturated current level. The characteristic just described for the reference chamber is illustrated by curve 38R in FIG. 2. Curve 38R flattens to achieve a constant saturated ion current $I_R$ which is relatively insensitive to differences in applied voltage across reference chamber 10.

The saturation current $I_R$ flowing through the reference chamber 10 and the radioactive source 22 of the signal chamber 20 establish an operating characteristic for signal chamber 20 shown by curve 40S. The series connection of the reference and signal chambers requires that the same value of saturated ion current $I_R$ must likewise flow through the signal chamber 20 since the gate electrode of the FET 30 provides no significant current drain from junction 28. Also, the voltage applied at terminal 18 is known and has, for example, a value V. The saturated ion current $I_R$ and the applied voltage establish the distribution the voltage across the reference chamber $V_R$ and the voltage across the signal chamber $V_S$ as shown in FIG. 2. The voltage $V_S$ is monitored and predetermined changes in this voltage provide the alarm as previously described.

The signal chamber 20 is open to ambient conditions and operates in a non-saturated condition. It is therefore sensitive to smoke particulates and products of combustion which modify the mobility of the ions in the signal chamber. Upon the introduction of particulates of combustion some of the ions caused by alpha particle from the source 22 are captured or absorbed, thereby tending to decrease the ion flow between electrodes 24 and 26 of the signal chamber 20, but because the saturated ion current must also flow through the signal chamber, the voltage across the signal chamber increases to provide the necessary increase in ion mobility for maintaining the current level. The altered electrical characteristics of the signal chamber under the condition of increased products of combustion are shown by curve 40S', for example. Under these altered conditions, the voltage across the reference chamber changes to $V'_R$ and the voltage across the signal chamber changes to $V'_S$. The voltage $\Delta V$ reflects the change in voltage across the signal chamber from a non-combustion product condition $V_S$ to a condition indicting the presence of products of combustion $V'_S$. When the voltage change $\Delta V$ exceeds predetermined limits, indicating a predetermined extent of products of combustion in the signal chamber 20, a signal is provided by alarm 34.

The foregoing description of the prior art combustion product detector illustrates its advantages. A reference condition is always maintained by the reference chamber 10 to which the combustion product condition monitored by the signal chamber 20 is compared. This comparison provides highly reliable and precise operation under most conditions. These and additional advantages are secured by the present invention as will be apparent from the following description.

Figure 3:
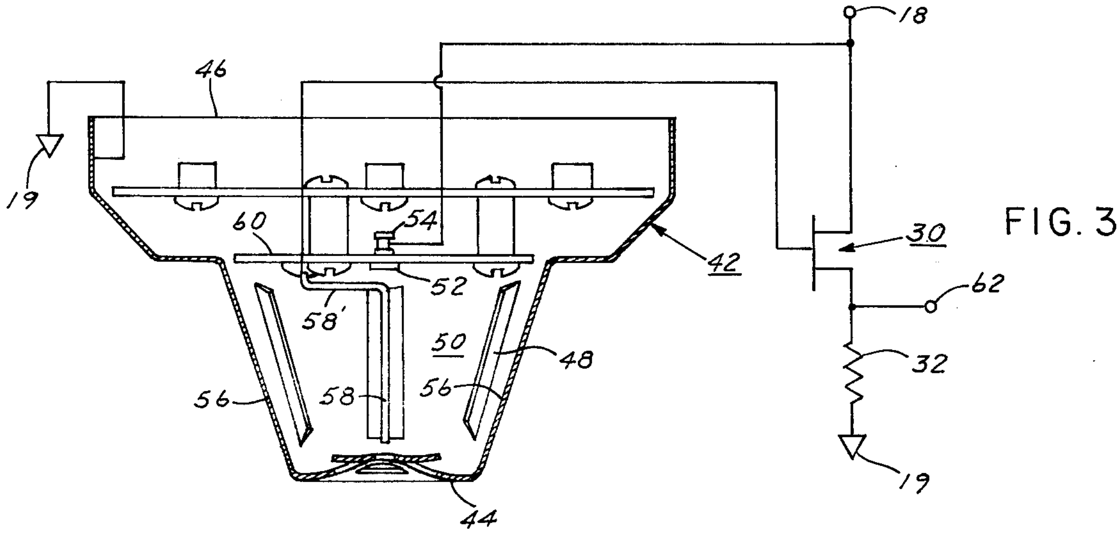
FIG. 3 is a side view of one embodiment of the present invention including schematic electrical circuitry.

FIG. 3 shows one embodiment of the present invention. There a combustion product detector of the ionization chamber type is formed by an elongated housing 42 having walls which, by way of example, have been illustrated as generally in the form of a truncated cone. The housing includes a louvered end 44 and an end 46 which is closed when the detector is attached to a surface such as a ceiling. A plurality of side louvers 48 comprise a means for introducing ambient air and any combustion products present into the interior of the combustion product detector. The louvers may be generally parallel to the axis of the elongated housing. The typical combustion product detector will have from six to ten louvers, and each of the louvers is arranged to block stray electrical fields which could otherwise be coupled into the signal sensing region of the detector. The interior of the combustion product detector forms an ionization chamber generally referenced as 50. A source 52 of alpha particle radiation such as americium 241 is located within the ionization chamber and provides ions within the chamber as a source of electrical current. Electrodes or means for applying voltage across and conducting current through various portions of the ionization chamber are also provided. For example, in the embodiment shown in FIG. 3, a first electrode 54 is unitary in construction with the source of radiation 52, and this combination is located near the end 46 of the housing in the axial center of the elongated portion. The source of radiation may be encased within the metal forming the first electrode 54, or may be immediately adjacent or coincident with the first electrode. A second electrode 56 may be adjacent the walls of the elongated housing or may be an internal conductor in the housing or may be formed by the housing 42 itself if the housing is an electrical conductor, which is the case in FIG. 3. A signal electrode 58 extends axially through the axis of the elongated housing and is separated from the first electrode 54 by a relatively small distance between the electrode and a bent and laterally extending portion 58'. The signal electrode 58 is mounted in a very high quality insulator 60 which also retains the first electrode 54 and source 52. The insulator 60 and the laterally extending bent portion may form a means for supporting the signal electrode within the housing. The first electrode 54 may be connected to a positive voltage terminal 18, and the second electrode 56 may be connected to the negative reference 19. The signal electrode 58 is connected to the gate electrode of the FET 30, and terminal 62 is provided for monitoring the voltage appearing across the resistor 32 connected to the FET 30.

Arranged in the foregoing manner, a reference zone is formed between the bent and laterally extending portion 58' of the signal electrode and the combined first electrode 54 and source 52. This reference zone may be defined by a space falling within the range of +0.1 to +0.2 inches between the source first electrode and the signal electrode but having a preferably spacing of 0.15 inches. The remaining relatively large portion of the ionization chamber 50 comprises a signal zone. The signal zone is defined by the large space separating the signal electrode 58 and the second electrode 56. It should be understood that in the illustrated embodiment of the invention at least two electrodes are provided separated from one another across both the reference and signal zone within a single ionization chamber. In the embodiment illustrated in FIG. 3, two of those electrodes are common and form a single electrode designated as the signal electrode 58 which serves as one electrode for the reference zone and one electrode for the signal zone. The signal electrode 58 and the second electrode 56 provide a means for monitoring the voltage across the signal zone. The first and second electrodes 54 and 56, respectively, provide a means for applying the voltage across the reference and signal zones connected in series, the series connection being inherent in the signal electrode serving as a common electrode for the signal and reference zones.

Figure 4:
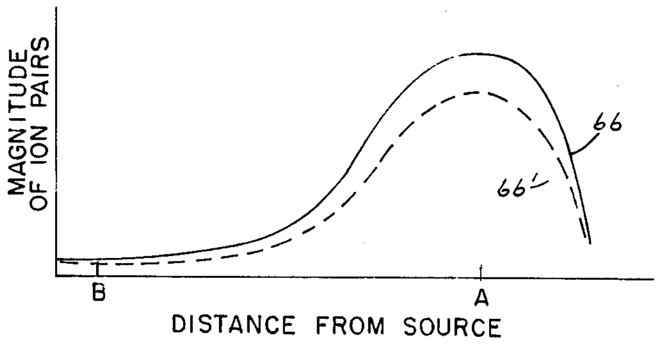
FIG. 4 is a graph used to explain the theory and operation of the present invention.

Graph 66 of FIG. 4 discloses a typical distribution of numbers of ion pairs created by a source of radiation versus distance from that source of radiation, known as a Bragg curve. As can be seen from graph 66 the maximum extent of ionization occurs at distance A from the source. The effect of products of combustion on this curve is illustrated by graph 66' which shows that a lesser magnitude of ionization occurs at distance A as a result of the products of combustion absorbing some of the ion pairs. Distance B represents the set separation and close proximity of the first and signal electrodes across the reference zone of the present invention. Notice that a low degree of ionization is provided at distance B and the products of combustion have a relatively insignificant effect on the magnitude of ionization at this distance B from the source as shown by graph 66' at B, thus explaining the relatively stable and constant characteristics of the reference zone that give rise to the constant saturation current.

The relative distance A and the magnitude of ion pairs produced are dependent on the alpha particle energy of the source. For higher energy sources the distance A occurs further from the source. The distance of maximum ionization, A, is related to the alpha particle energy of the source in a linear fashion. For example, the distance of maximum ionization occurs at a distance twice as far removed from the source when an alpha particle energy of the source is twice as great.

Figure 5:
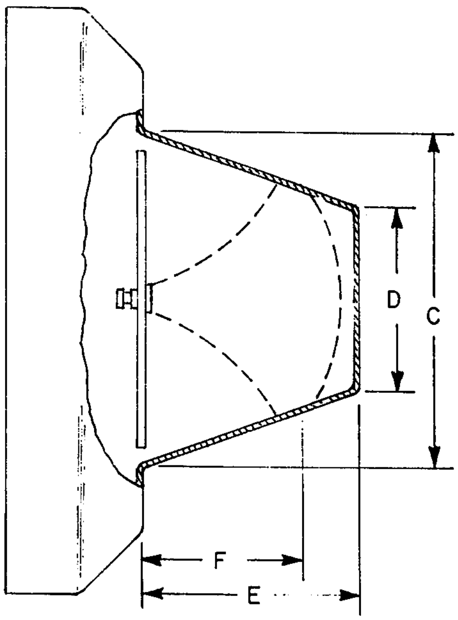
FIG. 5 is a partial side view showing the substance of graph of FIG. 4 employed in the present invention.

In the embodiment of FIG. 3, a source having an energy peak of 4.7 MEV may be used. With this energy maximum ionization occurs at approximately 1.2 to 1.3 inches from the source. The dimensions of the housing 42 which forms the ionization chamber 50 that have proved satisfactory with this source are as follows: the cone shaped housing has a larger diameter of approximately 2 inches and a smaller diameter of 1.35 inches and a height of 1.5 inches as shown by dimensions C, D and E, respectively, of FIG. 5. The sloping walls of the cone insure that the signal and second electrodes are always in contact with the Bragg curve ion cloud 68 although it has been found that other wall configurations also achieve satisfactory results. FIG. 5 shows the relative distribution of the ion pairs within the ionization chamber according to the Bragg curve, and it is readily apparent that the point of maximum ionization of this ion cloud is always in contact with the signal and second electrodes. The point of maximum ionization is shown approximately at dimension F as approximately 1.2 to 1.3 inches. Obviously, this dimension F of 1.2 to 1.3 inches is well within the height dimension E of 1.5 inches.

It should be understood that the dimensions provided for the configuration shown in the drawings are dependent upon the energy of the source, and are therefore exemplary only. Likewise it is not essential that the ionization chamber be cone shaped. It has been determined that a cylindrical housing provides satisfactory performance when the cylinder has a height of at least 1.3 inches, a diameter of 1.5 inches and a source having 4.7 MEV energy. Under these conditions the point of maximum ionization also is present approximately 1.2 to 1.3 inches from the source.

The operation of the combustion product detector of FIG. 3 is analogous to that of prior art two-chamber static devices. The saturated ion current established by the source 52 flows through the reference zone between the first electrode 54 and the signal electrode 58. The applied voltage V at terminal 18 and the saturation current $I_R$ in the reference zone establish the operating conditions $V_R$ and $V_S$, for example, as illustrated in FIG. 2. The introduction of products of combustion in the ionization chamber 50 through louvers 48 tends to cause a reduction in ions due to the products of combustion absorbing the ions caused by alpha particle collision with the air inside the ionization chamber 50. This reduction causes a shift in the electrical characteristic of the signal zone as shown by curve 40S' in FIG. 2, and the voltage across the signal zone increases to provide the increased mobility of ions to maintain the saturated ion current level through the signal zone. Due to the small separation of the electrodes across the reference zone the introduction of products of combustion causes a relatively insignificant effect on the operating characteristic of the reference zone, thus leaving the saturated ion current almost uneffected by the presence of products of combustion. The observed behavior of the combustion product causing a maximum change voltage across the signal zone at the location of maximum ionization according to the Bragg curve is monitored by the arrangement of the second electrode 56 and signal electrode 58, since both electrodes extend through the range in which the maximum voltage change occurs. The voltage characteristic across the reference and signal zones is shifted to $V'_R$ and $V'_S$, respectively, as is illustrated in FIG. 2. The change in voltage $\Delta V$ across the signal zone effects the FET 30 and a voltage related to this change appears at output terminal 62. Voltage changes of significant magnitude may then trigger an alarm.

It should also be noted that a current will flow between the first electrode 54 and the second electrode 56. This current is a parallel current through the ionization chamber which flows between the positive terminal 18 and the negative reference. This current varies according to the ionization and products of combustion in the chamber 50, but does not effect performance of the combustion product detector since it flows separately from the saturated ion current.

From the foregoing description of the invention, it is readily apparent that the ionization dual-zone static detector having a single radioactive source achieves all the desirable operational characteristics of conventional prior art detectors employing separate reference and signal chambers. The present invention achieves further advantages not present in such prior art devices. The present invention is highly wind resistant. Wind or fast moving air may remove a significant amount of products of combustion from the signal chamber in prior art two-chamber static devices before the alarm condition is signalled. However, wind flowing through the detector of the present invention removes the ion cloud from both the reference and signal zones in approximately the same ratio leaving the voltage across both zones effected to the same degree. Thus, the present invention provides reliable signal indications even in windy environments. Furthermore, erroneous signals due to a contaminated radioactive source are greatly reduced. In prior art detectors, surface contamination of the source effects only one chamber causing a shift in operating characteristics of that chamber only, which could signal an alarm. However, in the present invention the single radioactive source, if contaminated, would have the same effect on both chambers significantly reducing the possibility of a false alarm. It is likewise apparent that the present invention requires only one radioactive source, thereby achieving a significant cost reduction. Furthermore, the selection of radioactive sources having a particular activity is no longer required, which is a major production advantage because radioactive sources may vary considerably in their activity. The combustion product detector according to the present invention does not require the air tight chamber that is very difficult to manufacture, as do prior art two-chamber devices. The described invention requires no adjustment since the reference zone may have a relatively wide tolerance in dimensional separation as disclosed and the tolerances of the ionization chamber are not critical since the electrodes are arranged to monitor the maximum extent of voltage change. All of these factors contribute to economy in production while providing a product achieving increased performance and operation.

Figure 6:
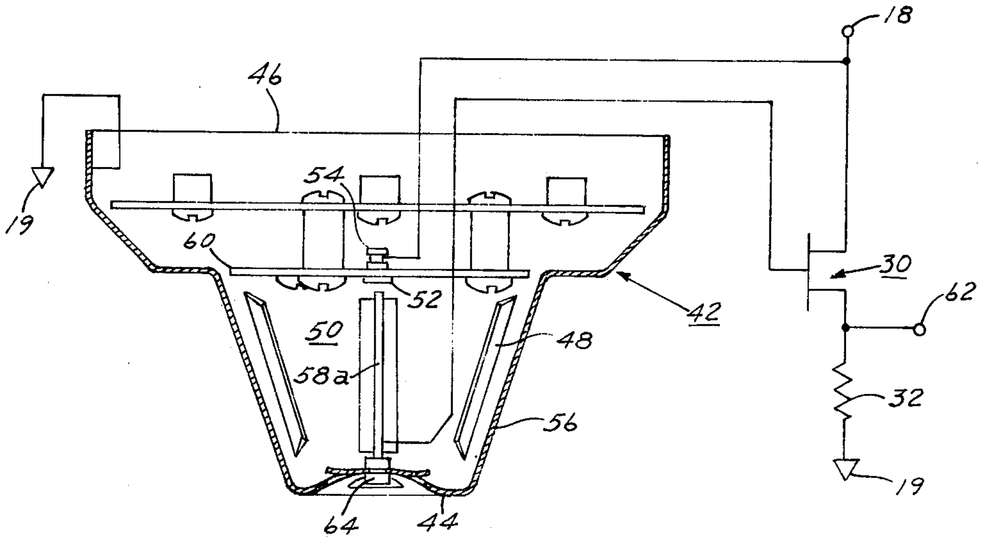
FIG. 6 is a side view of an alternative embodiment of the present invention; and, FIG. 7 is an alternative arrangement of a portion of the present invention which may be employed in any of the embodiments.

Referring now to FIG. 6, there is shown an alternative embodiment of the present invention, in which corresponding elements are identified by the same reference numbers. In this embodiment, a significant difference is in the construction of a signal electrode. The signal electrode **58*a* employed in this embodiment extends axially through the housing, and is separated from the first electrode 54 by its end rather than by the bend in the electrode. The end of the signal electrode 58*a* still provides a relatively small separation between itself and the first electrode 54 to provide the reference zone therebetween. In this embodiment the signal electrode 58*a* is mounted within said housing by a means for supporting the signal electrode and may be retained by and insulated from the louvered end 44 of the housing by an insulator 64. Alternatively, the signal electrode may be suspended by insulator 60 to avoid physical contact with the housing 44. However arranged, the signal electrode 58*a* is adaptable to be connected to the gate of the FET 30** and extends through the range in which maximum voltage changes occur as products of combustion enter the ionization chamber.

Figure 7:
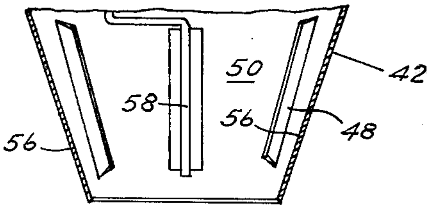

FIG. 7 discloses an open end arrangement of the end of the elongated housing 42. As previously discussed because the signal and second electrodes extend in the range where maximum ion pairs are produced, it is not essential that there be a closed end on the housing. Thus, the open end of FIG. 7 may be employed in conjunction with the embodiment of FIG. 3 or with the embodiment of FIG. 6 if a slightly modified means for supporting the signal electrode is used.

While the invention has been shown and described in connection with specific details of construction in two embodiments, various modifications and changes will occur to those skilled in the art. Therefore, it is not intended that the invention be limited to the details illustrated and it is intended by the appended claims to cover all modifications which fall within the true spirit and scope of the invention.

What is claimed is:

1. A combustion product detector of the ionization chamber type comprising:

an ionization chamber having therein a relatively small reference zone and a relatively large signal zone, and further including means for allowing introduction of ambient air and products of combustion;

a source of radiation located within said ionization chamber for generating ion pairs of low density in the reference zone and of high density in the signal zone;

means comprising pairs of electrodes spaced apart across the reference and signal zones for applying voltage across and conducting current through the reference and signal zones in series, said voltage applying means being associated with the signal zone and arranged for sensing predetermined changes in voltage across the signal zone produced by products of combustion in the ionization chamber; and, means for monitoring the voltage across the signal zone.

2. The combustion product detector as recited in claim 1 wherein one pair of electrodes is spaced across each of the reference and signal zones.

3. The combustion product detector as recited in claim 2 wherein one electrode of the reference zone and one electrode of the signal zone are common and form a signal electrode, the other electrode of the reference zone forms a first electrode and the other electrode of the signal zone forms a second electrode.

4. The combustion product detector as recited in claim 3 wherein the first electrode and the source of radiation are unitary in construction.

5. The combustion product detector as recited in claim 4 wherein the first and signal electrodes are separated by a distance falling in the range of 0.1 to 0.2 inches.

6. The combustion product detector as recited in claim 4 wherein the signal and second electrodes extend approximately 1.2 inches from the source of radiation, and the source of radiation has energy of approximately 4.7 MEV.

7. The combustion product detector as received in claim 3 wherein the means for monitoring the voltage across the signal zone includes the signal and second electrodes.

8. The combustion product detector as recited in claim 3 wherein the signal and second electrodes extend approximately 1.2 inches from the source of radiation, and the source of radiation has energy of approximately 4.7 MEV.

9. The combustion product detector as recited in claim 3 further including a housing having an interior wall defining the ionization chamber, and said housing further having louvers constituting at least a portion of said means for introducing ambient air and products of combustion, and wherein:

the first electrode and the source of radiation are unitary in construction and are located near one end of the housing;

the signal electrode extends axially through the housing and is separated from the first electrode by a relatively small distance, thereby defining the reference zone therebetween; and, the second electrode comprises the interior wall of the housing, thereby defining the signal zone between the second electrode and the signal electrode.

10. The combustion product detector as recited in claim 9 wherein the housing is of truncated conical configuration having a smaller diameter of 1.35 inches, a larger diameter of 2.0 inches and a height of at 1.5 inches, and said first electrode and source of radiation are located near the end of the larger diameter.

11. The combustion product detector as recited in claim 10 wherein the relatively small distance between the first and signal electrodes is in the range of 0.1 inches to 0.2 inches.

12. The combustion product detector as recited in claim 10 wherein the relatively small distance between the first and signal electrodes is approximately 0.15 inches.

13. The combustion product detector as recited in claim 10 wherein the signal and second electrodes extend approximately 1.2 inches from the source of radiation, and the source of radiation has energy of approximately 4.7 MEV.

14. The combustion product detector as recited in claim 2 wherein the pair of reference zone electrodes is located in close proximity to said source of radiation.

15. The combustion product detector as recited in claim 14 wherein:

one electrode of the pair of reference zone electrodes is unitary with the source of radiation; and, the pair of reference zone electrodes is separated by a distance falling in the range of 0.1 to 0.2 inches.

16. The combustion product detector as recited in claim 2 wherein the pair of signal zone electrodes is located a predetermined distance from said source of ionization to sense changes in voltage with changes in the amount of products of combustion.

17. The combustion product detector as recited in claim 16 wherein the predetermined distance is linearly related to the energy available from the source of radiation.

18. The combustion product detector as recited in claim 1 further including an amplifier connected to the means for monitoring the voltage across the signal zone for producing an output signal related to a voltage across the signal zone.

19. The combustion product detector as recited in claim 18 further including means connected to the amplifier for producing an alarm indication upon application of an output signal from the amplifier exceeding a predetermined limit.

20. A combustion product detector of the ionization chamber type, comprising: an ionization chamber having therein a relatively small reference zone and a relatively large signal zone, and further including pairs of electrodes spaced apart across the reference and signal zones and comprising, a housing having an elongated wall portion;

a first electrode mounted within said housing near an end of said housing in the axial center of the elongated portion;

a source of radiation mounted within said housing adjacent said first electrode;

a signal electrode mounted within said housing and projecting generally through the axis of the elongated portion of said housing, said signal electrode being separated from said first electrode by a relatively small distance; and, a second electrode mounted within said housing axially with the elongated wall portion.

21. The combustion product detector as recited in claim 20 wherein the elongated wall portion of the housing has louvers for allowing the introduction within said housing of ambient air and combustion product.

22. The combustion product detector as recited in claim 21 wherein the louvers are generally parallel to the axis of the elongated portion.

23. The combustion product detector as recited in claim 20 wherein said source of radiation is mounted as a part of said first electrode thereby forming a unitary structure therewith.

24. The combustion product detector as recited in claim 23 further including means for supporting said signal electrode within said housing.

25. The combustion product detector as recited in claim 24 wherein: said signal electrode has its end remote from said supporting means spaced from said first electrode by the relatively small distance.

26. The combustion product detector as recited in claim 24 wherein said supporting means comprises a bent portion of said signal electrode extending laterally and spaced a small distance from said unitary source of radiation and first electrode.

27. The combustion product detector as recited in claim 26 wherein said supporting means further includes an insulator suspended within said housing near one end, and wherein:

the laterally extending bent portion of the signal electrode is secured to said insulator at the outer end of said bent portion; and, said first electrode and said source of radiation are retained by said insulator.

28. The combustion product detector as recited in claim 23 further including an insulator suspended within said housing near one end, and wherein said first electrode and source of radiation are retained by said insulator.

29. The combustion product detector as recited in claim 28 wherein:

said signal electrode includes a bent portion separated from said first electrode; and, the bent portion of said signal electrode is retained by said insulator to cause the signal electrode to project generally along the axis of the conduit portion of said housing.

30. The combustion product detector as recited in claim 29 wherein said second electrode is a part of the elongated wall portion of said housing.

31. The combustion product detector as recited in claim 29 wherein the elongated wall portion of said housing has a closed end.

32. The combustion product detector as recited in claim 31 wherein:

the elongated wall portion of said housing is of generally truncated conical shape; and, the closed end is formed at the smaller end of the truncated cone.

33. The combustion product detector as recited in claim 32 wherein the closed end has louvers formed therein.

34. The combustion product detector as recited in claim 31 wherein said second electrode is a part of the elongated wall portion of said housing.

35. The combustion product detector as recited in claim 31 wherein the closed end has louvers formed therein.

36. The combustion product detector as recited in claim 28 wherein:

the conduit portion of said housing has a closed end opposite the insulator; and, the closed end of said housing includes a second insulator located generally in the center of the closed end for retaining said signal electrode to cause said signal electrode to project generally through the axis of the conical portion of said housing.

37. The combustion product detector as recited in claim 36 wherein the closed end has louvers formed therein.

38. The combustion product detector as recited in claim 36 wherein:

the conduit wall portion of said housing is of generally truncated conical form; and, the closed end is formed at the smaller end of the truncated cone.

39. The combustion product detector as recited in claim 38 wherein the closed end has louvers formed therein.

40. The combustion product detector as recited in claim 36 wherein said second electrode is a part of the elongated wall portion of said housing.

* * * * *